(12) United States Patent
Ripoll et al.

(10) Patent No.: US 7,794,634 B2
(45) Date of Patent: Sep. 14, 2010

(54) PROCEDURE TO GENERATE NANOTUBES AND COMPOUND NANOFIBRES FROM COAXIAL JETS

(75) Inventors: Antonio Barrero Ripoll, Seville (ES); Ignacio Gonzáles Loscertales, Malaga (ES); Manuel Márquez Sánchez, Midlothian, VA (US)

(73) Assignees: Universidad de Sevilla, Seville (ES); Universidad de Malaga, Malaga (ES)

( * ) Notice: Subject to any disclaimer, the term of this patent is extended or adjusted under 35 U.S.C. 154(b) by 746 days.

(21) Appl. No.: 10/594,639

(22) PCT Filed: Mar. 17, 2005

(86) PCT No.: PCT/ES2005/000141

§ 371 (c)(1),
(2), (4) Date: Jun. 29, 2007

(87) PCT Pub. No.: WO2005/089042

PCT Pub. Date: Sep. 29, 2005

(65) Prior Publication Data

US 2008/0003168 A1 Jan. 3, 2008

(30) Foreign Application Priority Data

Mar. 22, 2004 (ES) .................................. 200400745

(51) Int. Cl.
*C25D 1/02* (2006.01)
*C25D 1/04* (2006.01)
*C01B 33/12* (2006.01)

(52) U.S. Cl. .................. 264/10; 264/459; 204/164; 204/165; 205/67; 205/73; 205/76; 205/77; 205/549; 977/700; 977/831; 977/901

(58) Field of Classification Search .................. 204/164, 204/165; 205/67, 73, 76, 77, 464, 549; 423/324, 423/325, 335; 997/700, 831, 901; 264/10, 264/459
See application file for complete search history.

(56) References Cited

U.S. PATENT DOCUMENTS

2004/0069632 A1* 4/2004 Ripoll et al. ................ 204/450

OTHER PUBLICATIONS

Sun, Zaicheng and Eyal Zussman, Alexander L. Yarin, Joachim H. Wendorff and Andreas Greiner, "Compound Core-Shell Polymer Nanofibers by Co-electrospinning," Advanced Materials, 15, No. 22 (2003), pp. 1929-1932.*
Dan Li, Amit Babel, Samson A. Jenekhe, and Younan Xia, "Nanofibers of Conjugated Polymers Prepared by Electrospinning with a Two-Capillary Spinneret," Adv. Mater, v16 No. 22, Nov. 18, 2004, pp. 2062-2066.*

(Continued)

*Primary Examiner*—Timothy C Vanoy
*Assistant Examiner*—Diana J Liao
(74) *Attorney, Agent, or Firm*—Arent Fox LLP

(57) ABSTRACT

The invention relates to a method of producing nanotubes from coaxial jets of immiscible liquids or poorly-miscible liquids. The purpose of the invention is to produce hollow fibers (nanotubes) or composite fibers having diameters ranging from a few micras to tens of nanometers and comprising walls, in the case of nanotubes, with a thickness ranging from hundreds of nanometers to a few nanometers. The inventive nanotube-formation method involves the generation of coaxial nanojets of two liquids using electrohydrodynamic technology.

12 Claims, 2 Drawing Sheets

OTHER PUBLICATIONS

Figure 1:
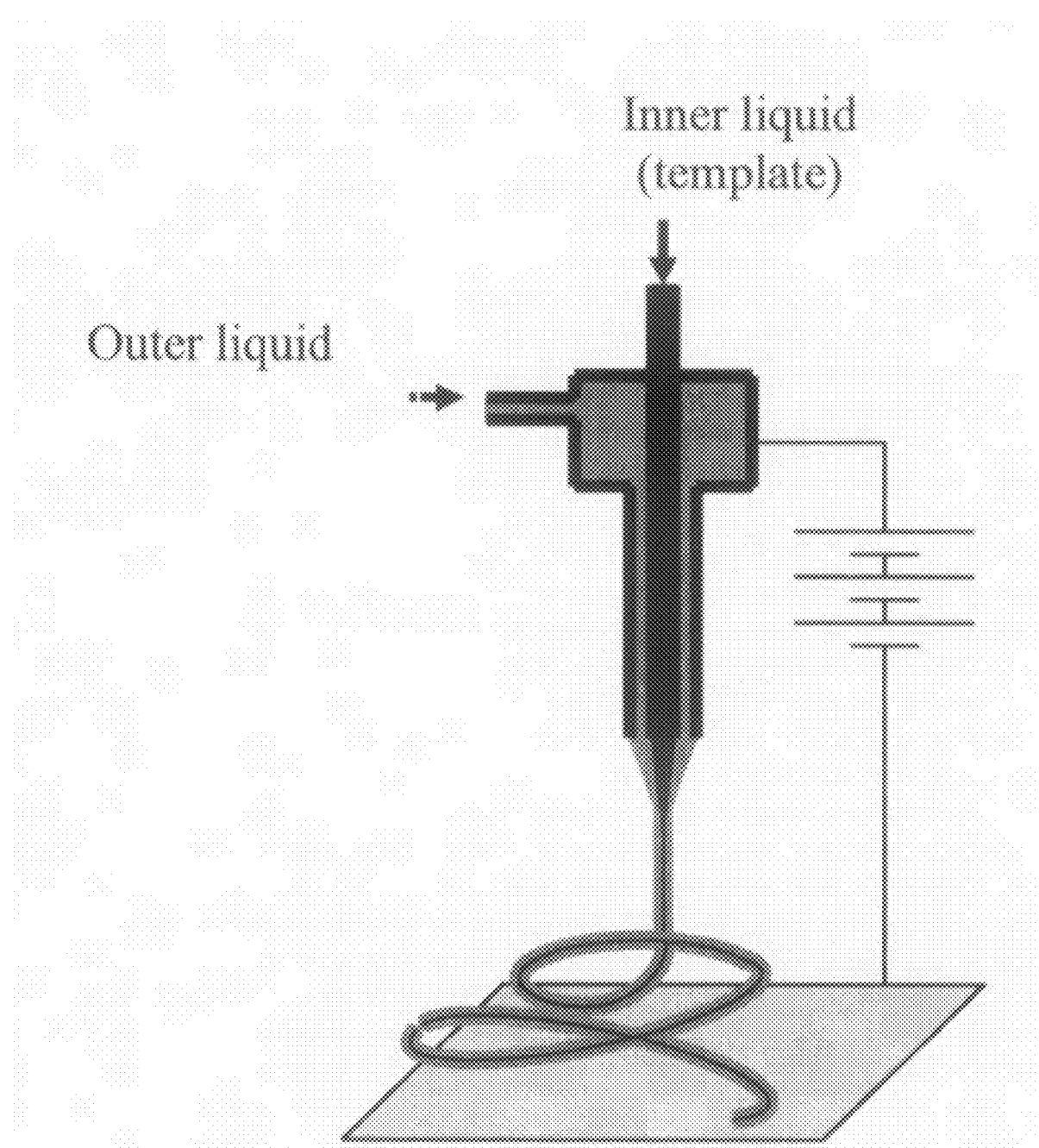

Ignacio G. Loscertales, Antonio Barrero, Manuel Marquez, Ruben Spretz, Raffet Velarde-Ortiz, and Gustavo Larsen, "Electrically Forced Coaxial Nanojets for One-Step Hollow Nanofiber Design," J Am.Chem Soc V 126, No. 17 (2004), pp. 5376-5377.*

* cited by examiner

PROCEDURE TO GENERATE NANOTUBES AND COMPOUND NANOFIBRES FROM COAXIAL JETS

SUMMARY OF THE INVENTION

The invention described in this document permits to fabricate nanotubes from coaxial jets of immiscible or poorly immiscible liquids. The objective is to produce hollow fibers (nanotubes) or compound fibers with diameters ranging from a few microns down to tens of nanometers, and with wall thickness, in the case of nanotubes, ranging from a few hundreds of nanometers down to a few nanometers. In this procedure for nanotube generation it resorts to the generation of coaxial nanojets of two liquids by means of electro-hydrodynamic techniques. If under appropriate excitation conditions (thermal, of evaporation, chemical, physical, optical) the fluid of the outer jet is made to solidify before the jet breaks up while that one flowing inside of the coaxial nanojet remains in liquid phase one obtains cylindrical fibers with core-shell structure, whose inside is the liquid which has not solidified, while the outer is a solid cylindrical structure (or solid enough) which permits to maintain the fiber-like shape of the nanojet. The liquid may naturally escape from the interior of the fiber when these are collected on a collector, thus generating hollow nanofibers or nanotubes. One of the advantages of the invention with respect to other existing techniques for the fabrication of nanotubes, is that the use liquid nano-templates (the inner liquid makes the role of the template) allows reducing, the number of operation and processes needed for the nanotube formation. It should be indicated that in the case that the inner liquid also solidifies one would obtain compound nano-fibers using the same procedure.

BACKGROUND

From the discovery of the first carbon nanotubes (S. Iijima, *Nature* 354, 56, 1991; A. Thess, R. Lee, P. Nikolaev, H. Dai, P. Petit, J. Robert, C. Xu, Y. H. Lee, S. G. Kim, A. G. Rinzler, D. T. Colbert, G. E. Scuseria, D. Tománek, J. E. Fischer, R. E. Smalley, *Science* 273, 483, 1996), the generation of tubular structures with submicrometric diameters and lengths one hundred thousand times the diameter or larger awake the interest of scientist and engineers. Currently, cylindrical structures such as nanotubes, of other materials different from carbon, are ideal candidates in the development of new technological applications in fields so diverse as: field and magnetic emitting screens (N. I. Kovtyukhova, T. E. Mallouk and T. S. Mayer, *Adv. Mater.* 15, 780, 2003), bio-catalysis and bio-separation (D. T. Mitchell, S. B. Lee, L. Trofin, N. Li, T. K. Nevanen, H. Soderlund and C. R. Martin, *J. Am. Chem. Soc.* 124, 11864, 2002), drug delivery (J. M. Schnur, *Science* 262, 1669, 1993), adsorbents (Y. Zhang and A. Reller, *Chem. Comm.* 606, 2002), and even electrical energy generators from microfluidic motion (J. Yang, F. Lu, L. W. Kostiuk, D. Y. Kwok, *J. Micromech. Microeng.* 13, 963-970, 2003).

There is a great variety of materials to build these tubular structures. For example, Greiner's group (M. Bognitzki, H. Hou, M. Ishaque, T. Frese, M. Hellwig, C. Schwarte, A. Schaper, J. H., Wendorff, A. Greiner, *Adv. Mater.*, 12, 9, 637-640, 2000.) developed its own process, termed TUFT, to generate nanotubes of polymeric materials, metallic and even hybrids. The technique consists on the generation, by electrodynamic means (electrospinning) of nanofibers of a certain polymer called PLA (poly(L-lactide)) and to use these nanofibers as nanotemplates. Later on, those nanofibers are coated with the desired material by means of Chemical Vapor Deposition (CVD). Once the fibers of PLA (nanotemplates) have been coated they are thermically degraded and they are extracted from the inside leaving only the tubular structure of the material which was deposited by CVD. Ai and coworkers (S. Ai et al., *J. Am. Chem. Soc.*, 125, 11140-11141, 2003) used the wall of the cylindrical pores in a membrane as external nanotemplates. In this case, the flow of a fluid with the appropriate precursors, in specific conditions, through those pores originated certain deposition of material, layer by layer, on the wall of the pores. At certain point, the membrane is eliminated by means of an appropriate degradation, leaving only the nanotubes grown in the interior of the cylindrical pores. In general, there exist references in the literature to different processes to generate nanotubes of semiconducting, polymers, metals and other materials (S. M. Liu, L. M. Gan, W. D. Zhang, H. C. Zeng, *Chem. Mater.* 14, 1391, 2002; H. Q. Cao, Y. Xu, J. M. Hong, H. B. Liu, G. Yin, B. L. Li, C. Y. Tie, Z. Xu, *Adv. Mater.* 13, 1993, 2001; C. M. Zelenski, P. K. Dorhout, *J. Am. Chem. Soc.* 120, 734, 1998; C. R. Martin, *Science* 266 1961, 1994; V. M. Cepak, C. R. Martin, *Chem. Mater.* 11, 1363, 1999). However, all of these processes used solid templates to give shape to the nanotubes.

On the other hand, there also exist processes to generate nanotubes in which templates are not used. In these processes, the formation of the tubular structure is driven by exclusively chemical forces (self-assembly), but they present the disadvantage that the chemistry is very specific: the simple change of a precursor for another one, chemically very similar, disallows the process of nanotube formation (R. M. Wang, Y. J. Xing, J. Xu, D. P. Yu, *New J. Phys.*, 5, 115, 2003; W. Chen. L. Q. Mai, Q. Xu, Q. Y. Zhu, J. F. Peng, published on web www.scipress.com/0-87849-926-1/145.htm, 2003; V. Ya. Prinz, A. V. Chekhovskiy, V. V. Preobrazhenskii, B. R. Semyagin, A. K. Gutakovsky, *Nanotechnology* 13, 231-233, 2002; H. Matsui, C. Holtman, *Nano Lett.*, 2, 887, 2002).

Even in the procedures in which nanotemplates are used, it is necessary that some forces drive the molecules that makes the nanotube towards the wall of the nanotemplate and force their assembly, that is, all the methods are affected by the specific chemical components which cause the self-assembly of the proper molecules on the nanotemplate, subtracting generality to the process, although no so dramatically as in the methods which are exclusively chemical. Furthermore, the methods based on solid nanotemplates on which the molecules forming the nanotube are assembled, need multiple steps to generate the nanotube from the basic materials: (1) formation of the solid nanotemplate, (2) assembling of the structure on the nanotemplate, (3) degradation or decomposition of the nanotemplate, and (4) extraction of the nanotemplate residue. Those 4 steps are usually described as only 3 in the literature: either the formation of the nanotemplate is not considered, or steps 3 and 4 are considered as just one step. In short, in the best case, the better processes described in the literature consist at least of 3 steps.

DETAILED DESCRIPTION OF THE INVENTION

The break up of the coaxial micro and nanojets of two immiscible liquids (or poorly miscible) generated by employing eletrohydrodynamic forces has been recently exploited to produce liquid capsules with, core-shell structure, with sizes ranging from tens of microns down to a few hundred of nanometers (I. G. Loscertales, A. Barrero, R. Cortijo and A. M. Gañán-Calvo, International PCT/ES02/00047; I. G. Loscertales, A. Barrero, I. Guerrero, R. Cortijo, M. Marquez and A. M. Gañán-Calvo, *Science* 292, 1695, 2002) When the fluid which forms the shell of the capsule may solidify the obtained results are solid capsules with a liquid core. Some samples have been applied to food materials (R. Bocanegra, I. G. Loscertales, A. Gaonkar, D. Pechack, M. Marquez, A. Barrero, *J. Aerosol Sci.* 34, S491, Abstracts of the European Aerosol Conference, Madrid, 31 Aug. 5 Sep. 2003; I. G. Loscertales, R. Cortijo, A. M. Gañán-Calvo, M. Márquez, International PCT/US02/02787), photopolymers (I. G. Loscertales, A. Barrero, I. Guerrero, R. Cortijo, M. Marquez and A. M. Gañán-Calvo, *Science* 292, 1695, 2002), and even sol-gel substances (G. Larsen, R. V.-Ortiz, K. Minchow, A. Barrero and I. G. Loscertales, *J. Amer. Chem. Soc.* 125, 1154, 2003); in particular, in this last case, the inner liquid was extracted through the pores of the shell to form submicrometric hollow spheres.

It is possible also to obtain structures with cylindrical geometry if the break up of the coaxial nanojet is avoided; that is if the solidification time of the outer liquid is smaller than the jet break up time. In effect, the use of electrohydrodynamic forces to produce a nanojet of a singe liquid being able of solidifying and thus forming nanofibers is being exploited under the general name of electrospinning (J. Doshi and D. H. Reneker, *J. Electrostat.* 35, 151, 1995; H. Fong, I. Chun and D. H. Reneker, *Polymer* 40, 4585-4592, 1999; G. Larsen, J. Wagner, J., D. Vu, C. Nguyen, E. Lotero, *Chem. Mater.* 10, 3756, 1998). The substantial difference of the method here described with the "electrospinning" is that, in the first case, the nanojet is formed by two liquids flowing coaxially, and if the outside liquid would solidify before the capillary instability (responsible for its break up) breaks it into nanodroplets, a compound nanofiber would be obtained, with a liquid in the inside and a solid cylindrical structure in the outside. Obviously, if both materials solidify one would obtain a compound nanofiber. However, if the inner liquid remains in liquid phase, when this compound nanofiber is collected on a surface, the liquid will leave from the inner of the cylindrical structure since there is no "closing" to retain it, therefore leaving a solid nanotube. In such a case, the inner liquid plays the role of a liquid nanotemplate, in clear contrast with the state of the art described in the previous section. Furthermore, the liquid nanotemplate as well as the assembly which produces the solidification occurs simultaneously, also in sharp contrast with other existing techniques, in which the template is independently made. Finally, due to the liquid character of the nanotemplate, it is not necessary to degrade it as in the case of solid nanotemplates; even more, the liquid nanotemplate is able of naturally leaving from the interior of the nanotubular structure, without the needs of specific extraction processes. Even in the most unfavorable case, washing with an appropriate dissolvent would allow eliminating the rests of the liquid-template form the inside of the nanotubes.

The invention which is proposed here is based on the combination of polymerization techniques and self-assembly, which are usually employed for the generation of nanofibers, with the formation of compound micro and nanojets generated by the procedure and device given in (I. G. Loscertales, A. Barrero, R. Cortijo and A. M. Gañán-Calvo, International PCT/ES02/00047; I. G. Loscertales, A. Barrero, I. Guerrero, R. Cortijo, M. Marquez and A. M. Gañán-Calvo, *Science* 292, 1695, 2002). The object is the generation of micro or nanocoaxial jets such us the liquid which flows for the outer of the micro or nanojet can solidify before its break up. The materials which are usually employed in electrospinning and self-assembly processes for the formation of fibers or particles, or which ever other with solidifying capacity are adequate candidates to be employed as outer liquid. For the inner liquid it is only required that its solubility with the outer liquid must be small enough to avoid that the core-shell structure of the micro or nanojet gets lost during the solidification process of the outer liquid. With respect to the process of formation of the compound micro or nanojet, whichever of the, two liquids, the outer or the inner, can act as conductor for the formation of the micro/nanojet (I. G. Loscertales, A. Barrero, I. Guerrero, R. Cortijo, M. Marquez and A. M. Gañán-Calvo, *Science* 292, 1695, 2002; J. M. López-Herrera, A. Barrero, A. López, I. G. Loscertales, M. Marquez, *J. Aerosol Sci.* 34, 535-552, 2003).

EXAMPLE 1

The use of a sol-gel formulation, with silicon precursors, to generate nanotubes in just one step. The inner liquid is olive oil.

In this example, the solidifying liquid consists of a sol-gel formulation of TEOS that yields silicon oxide ($SiO_2$) when solidifies. The inner liquid which acts as a template is, in this example, olive oil as purchased. Both liquids are injected at constant flow rates by syringe pumps. The range of flow rates of each liquid ranges between 0.1 and 10000 microliters per hour for the outer liquid and between 0.1 and 10000 microliters per hour for the inner one. The device for the generation of the micro/nanojet, which is sketched in FIG. 1 is that one given in (I. G. Loscertales, A. Barrero, R. Cortijo and A. M. Gañán-Calvo, International PCT/ES02/00047), and, as it is described there, when an electrical potential difference is established between the concentric capillaries and the collector plate, a compound conical meniscus (compound Taylor cone) anchored to the capillaries with an inner meniscus inside an outer one forms. From each of the two vertex issues a micro/nanojet that, since both jets flow coaxially, give rise to a coaxial jet with core shell structure. The configuration becomes steady for an appropriate range of values of both the flow rates and the electrical potential differences. In this configuration, the sol-gel configuration flows on the outside, while the olive oil flows on the inside of that compound micro/nanojet.

The sol gel formula is appropriately aged so that the outer jet solidifies before it breaks up into droplets. The jet breakup, in this case, yields cylindrical portions with lengths typically longer than 10 times its diameter, preferably longer than 100 times its diameter, called compound fibers, which are directly collected on a collector. These cylindrical compound fibers exhibit a core shell structure, in such a way that the shell is made of $SiO_2$ while the core contains olive oil. Since the core of these fibers is liquid (olive oil) it can leave from the inside of the fiber, although some part of it could be trapped inside. A simple washing with hexane or other solvent, or the exposure of the fibers to a moderate vacuum allows the elimination of the oil rests, thus leaving hollow nanofibers (nanotubes) of $SiO_2$, with submicrometric diameters and shell thicknesses smaller than 100 nanometers.

Figure 2:
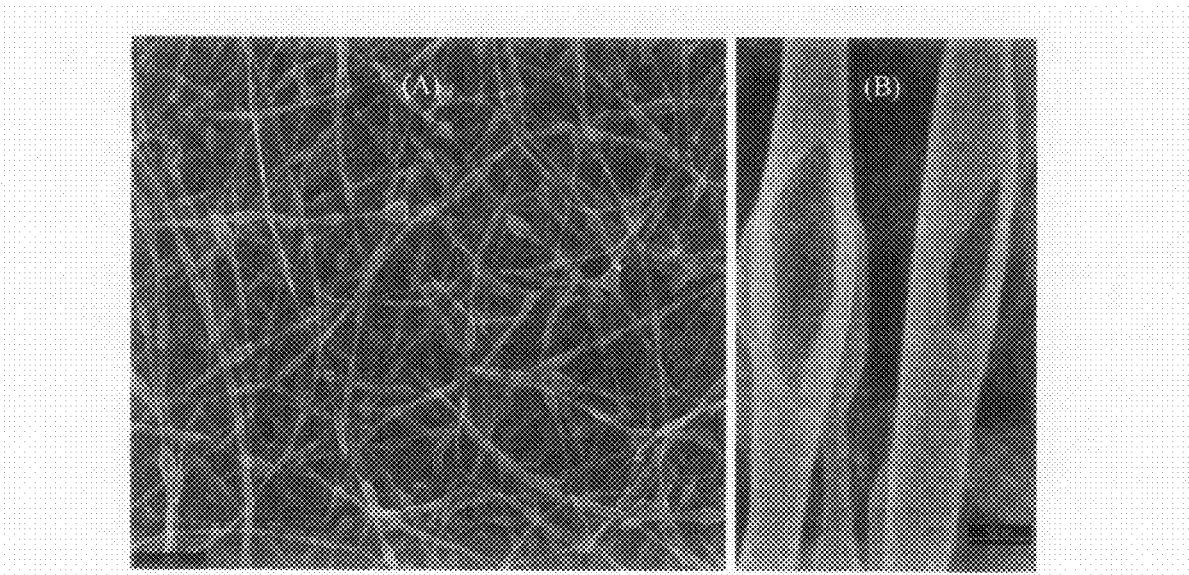

Results of this experiment, obtained with scanning electron microscopy, are shown in FIG. 2. Nanofibers just as collected in the collecting electrode are shown in FIG. 2(A). A detail of some of them that have been broken on purpose to show their hollow structure is given in FIG. 2(B). In this case, no special procedure has been followed to evacuate the oil from the core of the fibers just different from the vacuum exposure needed to metalize the fiber surfaces for seeing them in the scanning electron microscope. The diameters of the nanotubes are close to 500 nanometers while the shell thickness is a little bit lesser than 75 nanometers. In this case, the pre-aging of the sol-gel formula resulted in a solidification time comparable to that of the jet break up. This can be observed in the variation of the diameter along the fiber (like salami) as a consequence of the varicose instabilities, which are responsible of the final jet breakup if no solidification of the sol-gel occurred before.

EXAMPLE 2

The use of a sol-gel formulation, with silicon precursors, to generate nanotubes in just one step. The inner liquid is glycerol.

In this example, the solidifying liquid consists of a sol-gel formula of TEOS entirely similar to that of the previous case. The inner liquid that acts as template is, in this example, glycerol as purchased, with no treatment and since it is a liquid much more viscous than the oil used in the previous example, the jet will be much more stable; that is, its breaking up time will be much larger than in the other case. The flow rates of both liquids are in the same range that in the previous case and the experimental set up is entirely analogous. The coaxial nanojet that flows from the vertex of the electrified meniscus is formed by a core (glycerol) and the sol-gel formula which forms the liquid outer shell.

Figure 3:
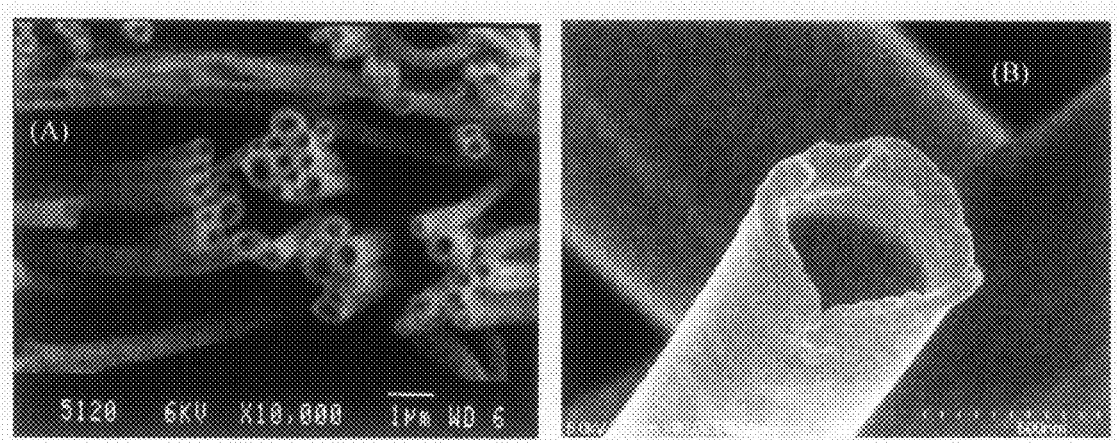

The results of this experiment have been analyzed by scanning electron microscopy, some of whose pictures are shown in FIG. 3. Fibers in FIG. 3(A) have been cut perpendicularly to their axes, just after collection, to show their tubular structure. Details of the structure of one of them, with about 400 nanometers of diameter and 60 nanometers of shell thickness, is shown in FIG. 3(B). Note that the fibers are perfectly cylindrical since the outer material solidifies before the varicose instabilities can develop.

The invention claimed is:

1. A method for producing nanotubes and compound nanofibers with core-shell structure from electrified coaxial jets, comprising the steps of:
    forcing a first liquid through a first electrified capillary tube to form a Taylor cone at the exit of the first electrified capillary tube, from whose vertex a very thin jet is issued having a flow rate ranging between 0.1 and 10000 microliters per hour; and
    forcing a second liquid, immiscible or poorly miscible with the first liquid, through a second capillary tube,
    wherein the second capillary tube is located inside the first electrified capillary tube and is approximately concentric with it,
    wherein the second liquid forms an almost conical meniscus, anchored at the exit of the second capillary tube, inside of the Taylor cone formed by the first liquid,
    wherein a jet of the second liquid, having a flow rate ranging between 0.1 and 10000 microliters per hour, is issued from the vertex of the conical meniscus of the second liquid,
    wherein the jet of the second liquid flows simultaneously and inside of the extremely thin jet of the first liquid, forming an extremely thin compound jet in which both liquids flow coaxially,
    wherein the second capillary tube can be at the same or different electric potential than that of the first electrified capillary tube and the potential difference between one of the two electrodes and the grounded electrode ranges between 1 V and 100 kV,
    wherein the menisci and the coaxial jet can form in a dielectric atmosphere, in a bath of a dielectric liquid, or in vacuum,
    wherein the compound jet comprises an inner core formed by the second liquid and an outer layer or coating formed by the first liquid, and the outer diameter of the compound jet has a diameter between 300 microns and 5 nanometers, and
    wherein the first liquid (that which flows on the outside) undergoes a phase change from liquid to solid, in such a way that the time needed for the phase change (solidification) of the first liquid is comparable or smaller than the residence time of the first liquid in the coaxial jet.

2. The method of claim 1, wherein the first liquid contains a polymer solution, or contains a mixture of polymers which can solidify under an appropriate excitation, wherein the solidification time of the first liquid is comparable or smaller than the residence time of the first liquid in the coaxial jet.

3. The method of claim 1, wherein the first liquid is a sol-gel formula containing precursors which are able of solidifying, wherein the solidification time of the first liquid is comparable or smaller than the residence time of the first liquid in the coaxial jet.

4. The methods of any one of claims 2 and 3, wherein the solidification of the first liquid produces compound fibers with core-shell structure, and wherein the core is formed by the second liquid.

5. The method of any one of claims 1 to 3, wherein the diameter of the compound fibers ranges between 300 microns and 5 nanometers.

6. The method of any one of claims 1 to 3, wherein the length of the compound fibers varies between one and thousand times the diameter of the compound fibers.

7. The methods of any one of claims 1 to 3, wherein the length of the compound fibers is larger than one thousand times the diameter of the compound fibers.

8. The method of any one of claims 1 to 3, wherein the thickness of the solid wall of the compound fibers varies between 99% and 1% of the diameter of the compound fibers, preferably between 75% and 15% of the diameter of the compound fibers.

9. The methods of any one of claims 2 and 3, wherein the solidification of the first liquid produces compound fibers with core-shell structure, wherein the core is formed by a second liquid which solidifies in times of the order of the solidification time of the first liquid; that is, coaxial nanofibers.

10. The methods of any one of claims 1 to 3, wherein the diameter of the coaxial nanofibers ranges between 300 microns and 5 nanometers.

11. The method of claim 1, wherein the length of the compound fibers ranges between 1 and 1000 times their diameter.

12. The methods of any one of claims 1 to 3, wherein the thickness of the solid wall of the compound fibers varies between 99% and 1% of the diameter of the compound fibers, preferably between 75% and 15% of the diameter of the compound fibers.

* * * * *